(12) United States Patent
Korus et al.

(10) Patent No.: US 7,023,828 B2
(45) Date of Patent: *Apr. 4, 2006

(54) METHOD AND APPARATUS FOR A MOBILE NODE TO MAINTAIN LOCATION PRIVACY FROM SELECTED CORRESPONDENT NODES

(75) Inventors: Michael F. Korus, Hoffman Estates, IL (US); Adam Cory Lewis, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 727 days.

This patent is subject to a terminal disclaimer.

(21) Appl. No.: 09/992,289

(22) Filed: Nov. 19, 2001

(65) Prior Publication Data

US 2003/0095522 A1    May 22, 2003

(51) Int. Cl.
*H04Q 7/24* (2006.01)
(52) U.S. Cl. .................. 370/338; 370/352; 370/432
(58) Field of Classification Search .............. 370/338, 370/349, 352, 390, 392, 401, 432; 709/202, 709/238; 713/163; 455/433
See application file for complete search history.

(56) References Cited

U.S. PATENT DOCUMENTS

| 5,910,951 | A | | 6/1999 | Pearce et al. | |
|---|---|---|---|---|---|
| 6,026,167 | A | * | 2/2000 | Aziz ........................... | 713/163 |
| 6,198,920 | B1 | | 3/2001 | Doviak et al. | |
| 6,230,012 | B1 | | 5/2001 | Willkie et al. | |
| 6,515,974 | B1 | * | 2/2003 | Inoue et al. ................. | 370/352 |
| 6,721,297 | B1 | * | 4/2004 | Korus et al. ................. | 370/338 |
| 6,785,254 | B1 | * | 8/2004 | Korus et al. ................. | 370/432 |
| 6,856,624 | B1 | * | 2/2005 | Magret ........................ | 370/392 |
| 2001/0012777 | A1 | * | 8/2001 | Igarashi et al. ............. | 455/433 |
| 2001/0036834 | A1 | * | 11/2001 | Das et al. .................... | 455/458 |
| 2001/0046223 | A1 | * | 11/2001 | Malki et al. ................. | 370/338 |
| 2002/0012327 | A1 | * | 1/2002 | Okada .......................... | 370/328 |
| 2002/0031107 | A1 | * | 3/2002 | Li et al. ...................... | 370/338 |
| 2002/0080767 | A1 | * | 6/2002 | Lee .............................. | 370/349 |
| 2002/0093943 | A1 | * | 7/2002 | De Oliveira ................. | 370/352 |
| 2002/0097718 | A1 | * | 7/2002 | Korus et al. ................. | 370/432 |
| 2002/0193116 | A1 | * | 12/2002 | Agrawal et al. ............. | 455/445 |
| 2003/0002468 | A1 | * | 1/2003 | Khalil et al. ................. | 370/349 |
| 2003/0063591 | A1 | * | 4/2003 | Leung et al. ................ | 370/338 |

(Continued)

OTHER PUBLICATIONS

David B. Johnson and Charles Perkins, Mobility Support in Ipv6, Internet Draft, Jul. 2, 2000, 122 pages, Nokia Research Center.

(Continued)

*Primary Examiner*—Duc Ho
*Assistant Examiner*—Phuongchau Ba Nguyen
(74) *Attorney, Agent, or Firm*—Steven R. Santema; Indira Saladi

(57) ABSTRACT

An IP mobility solution for mobile network(s) that combines features of IP multicast and mobile IPv6. The mobile network defines a mobile router (106) attached to one or more mobile network hosts (102). Upon movement of the mobile network from a home network to a foreign network, the mobile router obtains a multicast care of address on behalf of the attached mobile network hosts and creates a binding between the mobile subnet prefix and the multicast care of address. The mobile router communicates the binding information, via binding update messages, to a home agent (150) and to selected correspondent nodes (152) consistent with requested privacy attributes of the mobile network hosts. The privacy attributes allow the mobile network hosts to maintain the privacy of their care of address (and implicitly, their location) relative to certain correspondent nodes.

12 Claims, 15 Drawing Sheets

U.S. PATENT DOCUMENTS

2003/0093553 A1* 5/2003 Le et al. .................. 709/202

OTHER PUBLICATIONS

Ahmed Helmy, A Multicast-based Protocol for IP Mobility Support, 17 pages, Electrical Engineering Department, University of Southern California, helmy@ceng.usc.edu.

Soliman, Castelluccia, El-Malki, Bellier, Hierarchical MIPv6 Mobility Management (HMIPv6), Internet Draft, Jul. 2001, 32 pages.

G. Dommety, A. Yegin, C. Perkins, G. Tsirtsie, K. El-Malki, M. Khalil, Fast Handovers for Mobile Ipv6, Internet Draft, Jul. 2001, 69 pages, Working Group of the Internet Engineering Task Force (IETF).

T. Ernst, L. Bellier, A. Olivereau, C. Castelluccia, H. Lach, Mobile Networks Support in Mobile Ipv6 (Prefix Scope Binding Updates), Internet Draft, Jun. 22, 2001, 23 pages, Motorola Labs and INRIA Planete, France.

T. Ernst, C. Castelluccia and H. Lach, Extending Mobile-Ipv6 with Multicast to Support Mobile Networks in Ipv6, 8 pages, Motorola Labs, Paris.

H. Chaskar, Requirements of a QoS Solution for Mobile IP, Internet Draft, Aug. 20, 2001, 8 pages, Nokia Research Center.

* cited by examiner

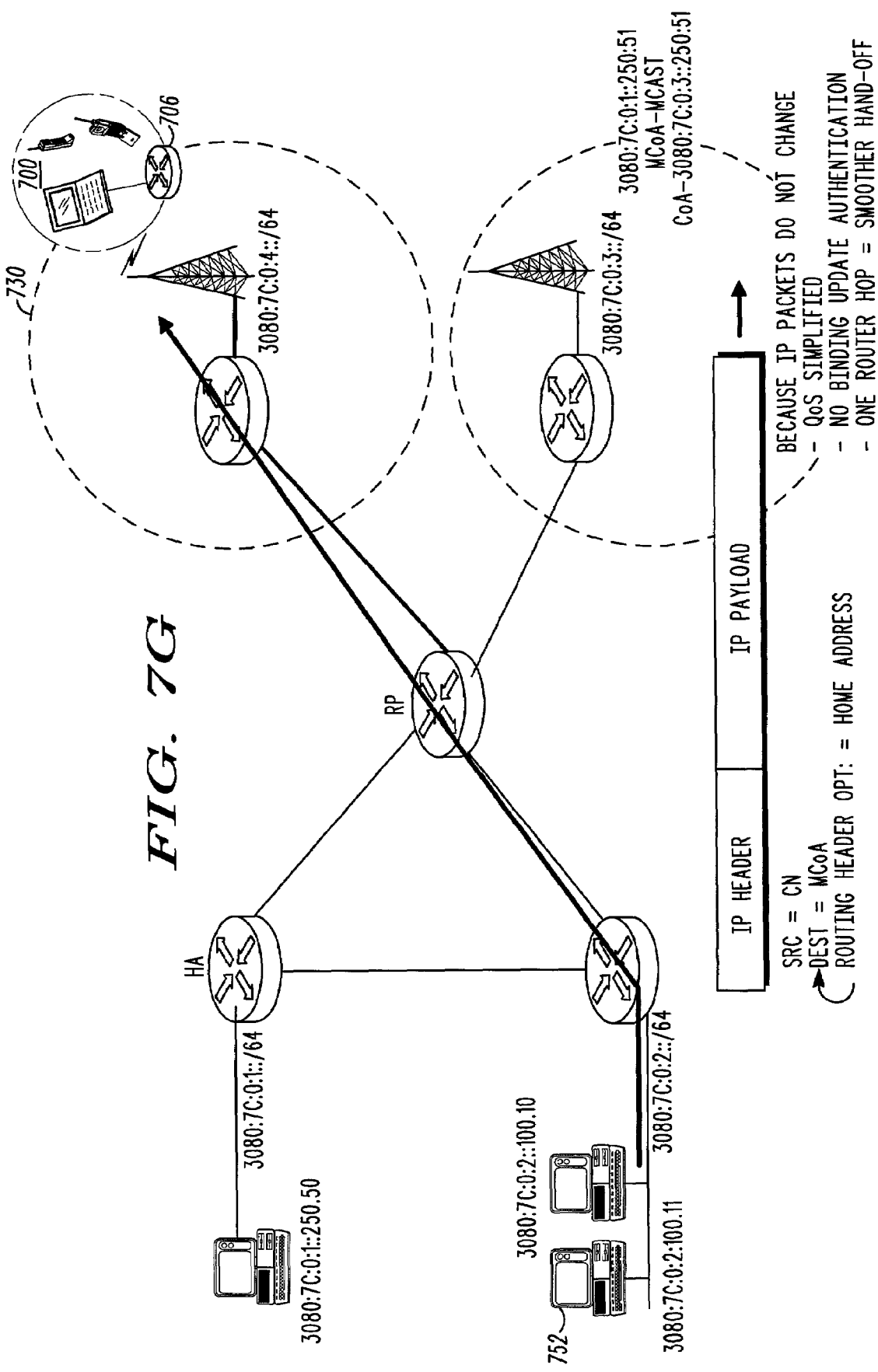

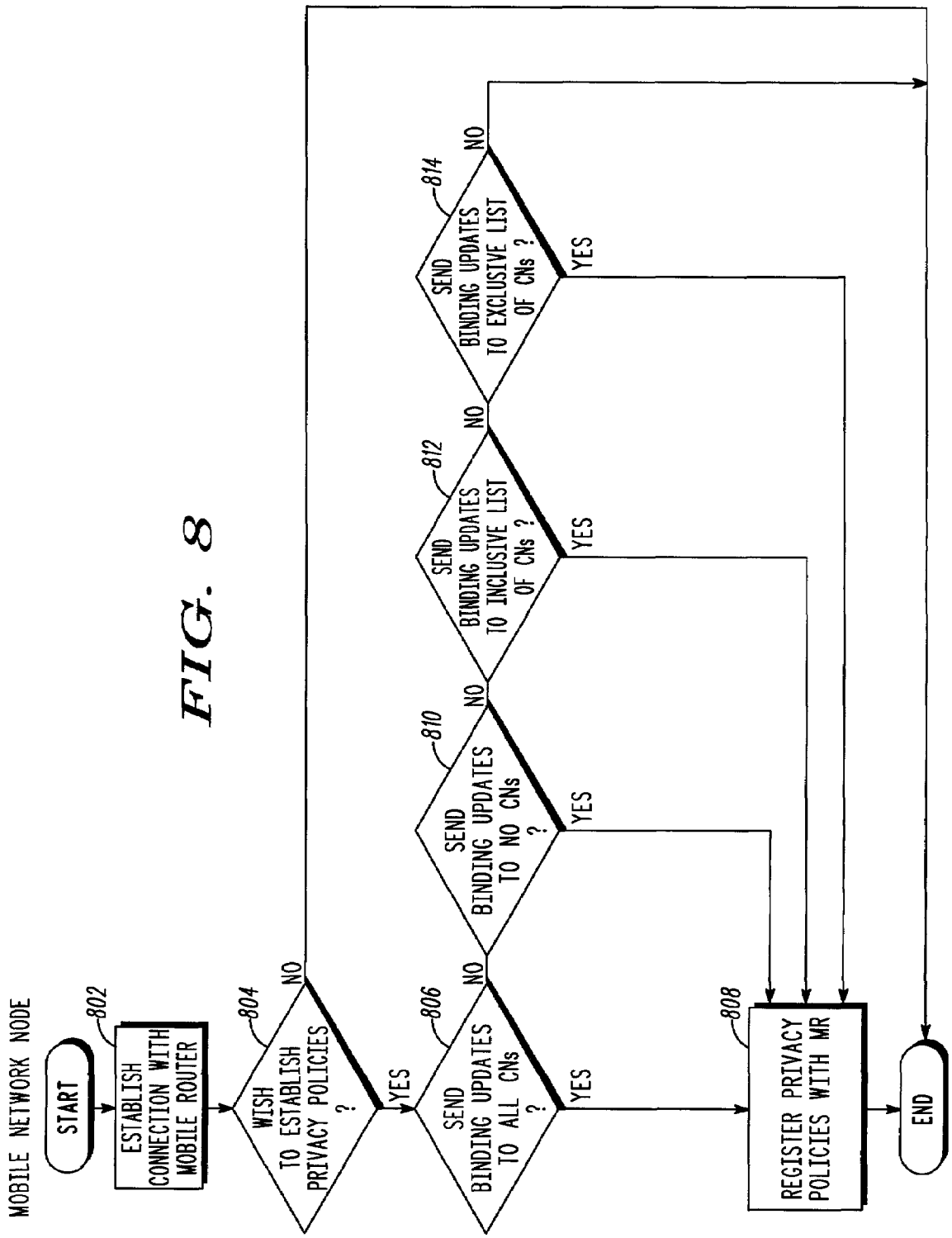

METHOD AND APPARATUS FOR A MOBILE NODE TO MAINTAIN LOCATION PRIVACY FROM SELECTED CORRESPONDENT NODES

CROSS REFERENCE TO RELATED APPLICATIONS

This application is related to U.S. patent application Ser. No. 09/993,255, titled "Method and Apparatus for Providing IP Mobility for Mobile Networks," filed Nov. 19, 2001, now U.S. Pat. No. 6,721,297, issued in Apr. 13, 2004 filed concurrently with the present application, assigned to the assignee of the present invention and incorporated herein by reference in its entirety.

FIELD OF THE INVENTION

This invention relates generally to mobile networks, and, more particularly, to a method and apparatus for maintaining location privacy of mobile nodes of the mobile network from selected correspondent nodes.

BACKGROUND OF THE INVENTION

Many communication systems use Internet Protocol (IP) to transport packet data representative of voice, video, data or control traffic between endpoints (or "hosts" in IP terminology). In such systems, the data is divided into IP packets called datagrams that include addressing information (e.g., source and destination addresses) that enables various routers forming an IP network to route the packets to the specified destination. The destination address may comprise a unicast address identifying a particular host or a multicast address shared by a group of hosts. Typically, the hosts include various fixed devices and mobile wireless devices, often called mobile terminals, that are capable of roaming from site to site or even between different communication networks that use IP.

As wireless communication and mobile internet access have grown in popularity, it is envisioned that multiple IP-addressable devices will be carried within a car, airplane, train (or even on a person). Such a collection of devices is known as a mobile network and the IP-addressable devices residing within the mobile network are known as mobile network nodes. It would be desirable to provide for IP mobility of the mobile network, that is to maintain IP connectivity for the mobile network nodes as the mobile network moves from site to site or between different communication networks.

The most recent IP standard, Internet Protocol version 6, called "IPv6," supports IP mobility for individual mobile nodes (presently defined in "draft-ietf-mobileip-ipv6-14.txt") but does not address mobile networks. Generally, mobile IPv6 provides for a mobile node to move to different sites or networks without changing its IP address. A mobile node is always addressable by its "home" IP unicast address associated with a home site or network, regardless of the node's current point of attachment to the network infrastructure. While situated away from its home network, the mobile node is also associated with a unicast forwarding address (known as a "care of" address). The mobile node is addressable either directly by the care of address or indirectly by the home address. In the latter case, the IPv6 protocol causes packets addressed to the home address to be intercepted by a "home agent" and tunneled to the care of address in a manner known as triangular routing.

To that end, mobile IPv6 relies upon a mobile node recognizing when it is at a foreign site and, in such case, to inform its home agent of its new care of address. This is accomplished by a message termed a "binding update." The mobile terminal may also send binding updates to various devices (termed "correspondent nodes") prospectively corresponding with the mobile node, such that the correspondent nodes will use the new care of address rather than the home address to avoid triangular routing. Optionally, the binding updates may be "piggybacked" or embedded with other messages sent to the home agent or correspondent node.

A problem that arises (and the main reason why mobile IPv6 does not support mobile networks) is that the mobile network nodes are not necessarily capable of recognizing when they are at a foreign site or new access technology, such that they would be able obtain respective care of addresses and send binding updates. Indeed, it is preferred that most mobile network nodes, while attached to the mobile network, need not be aware of the movement of the mobile network from site to site or to new access technologies. Moreover, even if they were, it is preferred that most mobile network nodes will not send binding updates so as to prevent so called binding update "storms" that could result from multiple mobile network nodes simultaneously sending binding update messages through the network. As will be appreciated, binding update storms create network traffic overhead that can adversely affect handoff times and quality of service of the network.

A related problem is that binding updates contain implied geographic location information that enable a recipient of the binding update to determine the location of a mobile network node. It would be desirable for certain mobile network nodes (i.e., those that do not wish to broadcast their new location throughout the network), to establish privacy attributes that would specify to whom binding updates should be sent through the network on their behalf. In such manner, the mobile network node could keep its location secret from some, or all correspondent nodes based on the privacy attributes. Advantageously, the privacy attributes may be selected independently by individual mobile network nodes.

Accordingly, a need has arisen to provide IP mobility support for mobile networks in a manner that builds upon the capabilities of mobile-IPv6, yet reduces or eliminates the number of binding updates that are required upon movements of the mobile network from site to site or between dissimilar access technologies. Advantageously, the IP mobility solution will allow for mobile network nodes to specify how binding updates should be sent on their behalf as the mobile network moves from site to site. The present invention is directed to satisfying these needs.

BRIEF DESCRIPTION OF THE DRAWINGS

The foregoing and other advantages of the invention will become apparent upon reading the following detailed description and upon reference to the drawings in which:

FIGS. 7a–g portray a sequence of movement of a mobile network wherein binding updates are minimized according to the present invention;

FIG. 8 is a flowchart showing steps performed by a mobile network node to establish privacy policies instructing its mobile router when to send binding updates.

DESCRIPTION OF PREFERRED EMBODIMENTS

Figure 1:
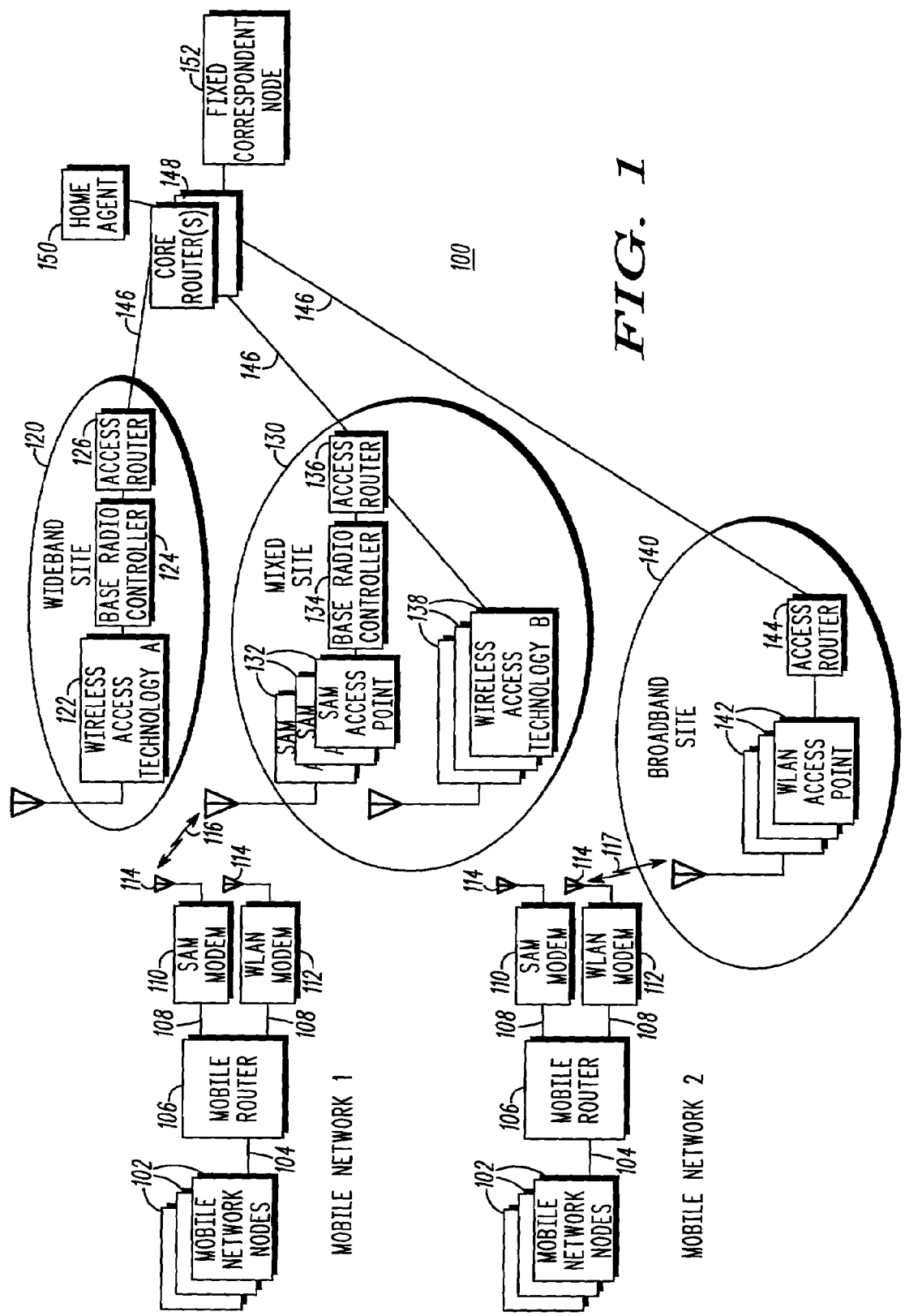
FIG. 1 is a block diagram showing an example multi-site communication system incorporating mobile networks according to the present invention.

FIG. 1 shows by way of example and not limitation, a packet-based communication system 100 comprising a plurality of mobile networks (two shown, denoted mobile networks 1 and 2). Generally, each mobile network comprises one or more mobile network hosts 102 (three shown) attached by link 104 to a mobile router 106, the mobile router 106 being operably connected by links 108 to one or more external network interfaces 110, 112. The mobile network hosts 102 comprise IP-addressable devices including, but not limited to, laptop computers, wireless mobile or portable two-way radios, cell phones, personal digital assistants (PDAs) and the like. The links 104, 108 are logical links that may be physically realized by wireline (e.g., Ethernet local area network (LAN)) or wireless (e.g., Bluetooth) links.

As defined herein, the term "mobile network host" will be understood to include the hosts 102 that are attached to the mobile router that, for the time of their attachment, are unaware of movement of the mobile network. The mobile network hosts 102 may or may not be capable of roaming independently from the mobile network. The term "mobile network node" will be understood to include the mobile network hosts 102 or the mobile router 106; and the term "mobile network" will refer collectively to the mobile router 106 and any attached mobile network hosts 102.

As shown, the communication system 100 is organized into a plurality of sites 120, 130, 140 each being accessible by one or more wireless access technologies. The wireless access technologies may vary from site to site and certain sites may have multiple access technologies. As shown, for example, site 120 (termed a "Wideband Site") is accessible by a first wireless access technology ("Wireless Access Technology A"); site 130 (termed a "Mixed Site") is accessible by radio frequency (RF) scalable amplitude modulation (SAM) and a second wireless access technology ("Wireless Access Technology B"); and site 140 (termed a "Broadband Site") is accessible by Wireless LAN (WLAN). SAM is an over-the-air protocol developed by Motorola, Inc. described and claimed in U.S. patent application Ser. No. 09/630,235, incorporated herein by reference in its entirety.

Generally, the mobile networks 1, 2 are physically associated with a carrier vehicle or person (not shown), such that they move throughout the communication system 100 coincident with movement of the carrier. As the mobile networks 1,2 move from site to site, they use the appropriate external network interface(s) 110, 112 to communicate with one or more selected access technologies of the site(s). As will be appreciated, the number and/or type of external network interfaces may vary for different individual mobile networks and/or communication systems. As shown, the external network interfaces of mobile networks 1, 2 comprise SAM modem 110 and WLAN modem 112. Mobile network 1 is using SAM modem 110 and antenna 114 to communicate via RF resources 116 with SAM access point 132 (site 130); and mobile network 2 is using WLAN modem 112 to communicate via RF resources 117 with WLAN access point 142 (site 140). In one embodiment, as will be described in greater detail in relation to FIG. 4, the mobile router 106 monitors and selects the appropriate external network interface(s) available to the mobile network independent from the mobile network nodes, such that the mobile network nodes need not even be aware of movement of the mobile network from site to site.

The sites 120, 130, 140 include various infrastructure devices for implementing, controlling or processing communications to and/or from the mobile networks, represented generally by "Wireless Technology A" block 122 and Base Radio Controller 124 (site 120); SAM Access blocks 132 and Base Radio Controller 134, and "Wireless Access Technology B" block 138 (site 130) and WLAN Access blocks 142 (site 140). Although not shown, the sites 120, 130, 140 may also include infrastructure devices including, but not limited to, dispatch console(s), call logger(s), gatekeeper(s), web server(s), video server(s), game server(s), IP gateway(s), comparator(s), telephone interconnect device(s), internet protocol telephony device(s) or scanner(s). These devices are typically wireline devices, i.e., connected by wireline to the base site(s) or other infrastructure device(s) but may also be implemented as wireless devices.

The sites 120, 130, 140 are logically coupled, via "access routers" 126, 136, 144 to one or more "core routers" 148 of the communication system 100. The access routers and core routers are logically connected via packet network links 146. The core routers 148 are connected to various correspondent nodes including a home agent 150 and, as shown, a fixed correspondent node 152. Although not shown in FIG. 1, the access routers may also be connected to correspondent nodes or the home agent. As will be appreciated, the access routers, core routers and home agent are functional router elements that may be embodied in separate physical devices or combinations of such devices.

Generally, the router elements comprise specialized or general purpose computing devices configured to receive IP packets from a particular host in the communication system 100 and relay the packets to other router(s) or host(s) in the communication system 100. The hosts include at least the mobile network nodes 102, mobile router 106, home agent 150 and correspondent nodes 152. Each host has a unique IP address. Packets are distributed between hosts from point-to-point using IP unicast routing protocols or from point-to-multipoint (i.e., to groups of hosts) using IP multicast routing protocols.

More particularly, routing is based on the IPv6 subnet prefix in a packet's destination IP address. Without specific support for mobility in IPv6, packets destined to a mobile node (host or router) would not be able to reach it while the mobile node is away from its home link (the link on which its "home" IPv6 subnet prefix is in use). In order to continue communication in spite of its movement, mobile-IPv6 provides for the mobile node receiving a care of address when it moves to a new link. In such case, the mobile node is addressable by its care of address (and indirectly, by its home address) after moving to a new link.

The home agent (or "HA") 150 is a router element that registers the current care of address of mobile nodes (e.g., the mobile networks 1, 2) and, responsive to mobility of a mobile node, intercepts packets destined to the mobile node's home address, encapsulates them, and tunnels them to the mobile node's registered care of address. As will be described in greater detail in relation to FIG. 3, the care of addresses for mobile networks include multicast, as well as unicast care of addresses to reduce the number of binding updates that would otherwise be required in response to movement of the mobile networks. The correspondent nodes (or "CNs")152 comprise peer nodes with which the mobile networks or nodes are communicating (or prospectively communicating). The correspondent nodes 152 may be fixed (as shown) or mobile nodes (e.g., mobile terminals or other mobile networks). The home agent 150 is also a correspondent node, although is a special case of correspondent node that performs mobility management functions as described herein.

Figure 2:
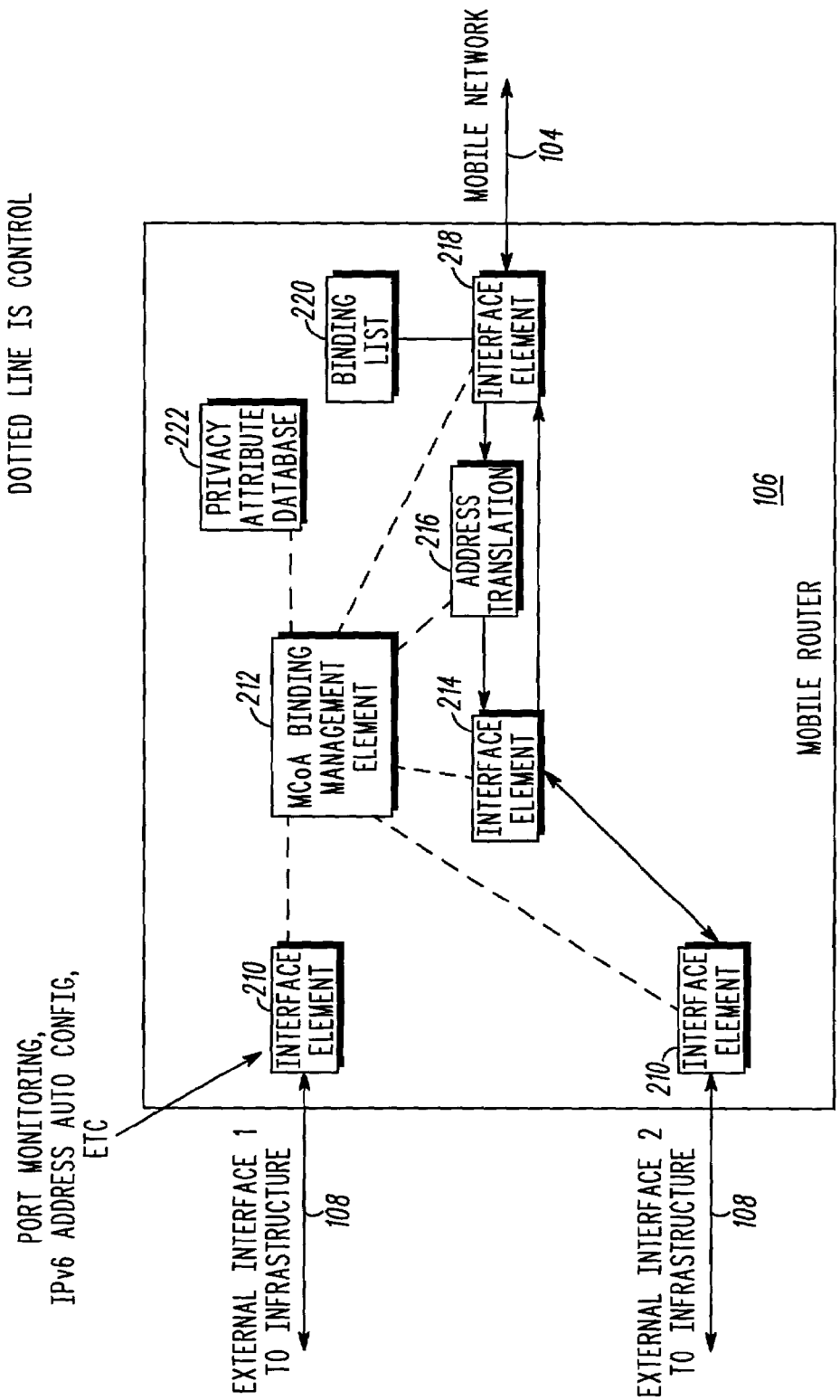
FIG. 2 is a block diagram of a mobile router according to the present invention.

FIG. 2 is a block diagram useful for illustrating various functional elements of the mobile router 106. For convenience, like reference numerals will be used to denote like elements in FIG. 1 and FIG. 2. The various functional elements may be embodied in one or more processors (which may comprise, for example, microprocessors, microcontrollers, digital signal processors or combination of such devices) and memory devices (which may comprise, for example, volatile or non-volatile digital storage devices or combination of such devices).

One or more external interface elements 210 (2 shown) and an internal (mobile host) interface 218 logically connect the mobile router, by respective links 108 and 104 to external interfaces and one or more mobile network hosts. The external interfaces may comprise SAM, WLAN or generally any wireless access technology interface, as has been described in relation to FIG. 1. A multicast care of address (MCoA) binding management element 212 manages the assignment of multicast care of address(es) associated with the mobile network and the formation of binding update messages, as needed, to communicate the multicast care of addresses to the home agent or correspondent nodes. A routing element 214 performs routing functions for the mobile router 106, that is to send and/or receive packets with other routers or hosts of the communication system 100 using IP unicast or multicast routing protocols, as appropriate. An address translation element 216 performs address translation functions for packets exchanged between a mobile network host and a correspondent node of an external network, as will be described in greater detail in relation to FIG. 5 and FIG. 6. A binding list 220 stores binding information associated with the mobile network and various correspondent nodes. A privacy attribute database 222 stores various privacy attributes of the mobile network hosts relative to various correspondent nodes. As will be described in greater detail in relation to FIG. 8 and FIG. 9, the privacy attribute database 222 is used by the mobile router to determine whether or not to send binding updates to certain correspondent nodes.

Figure 3:
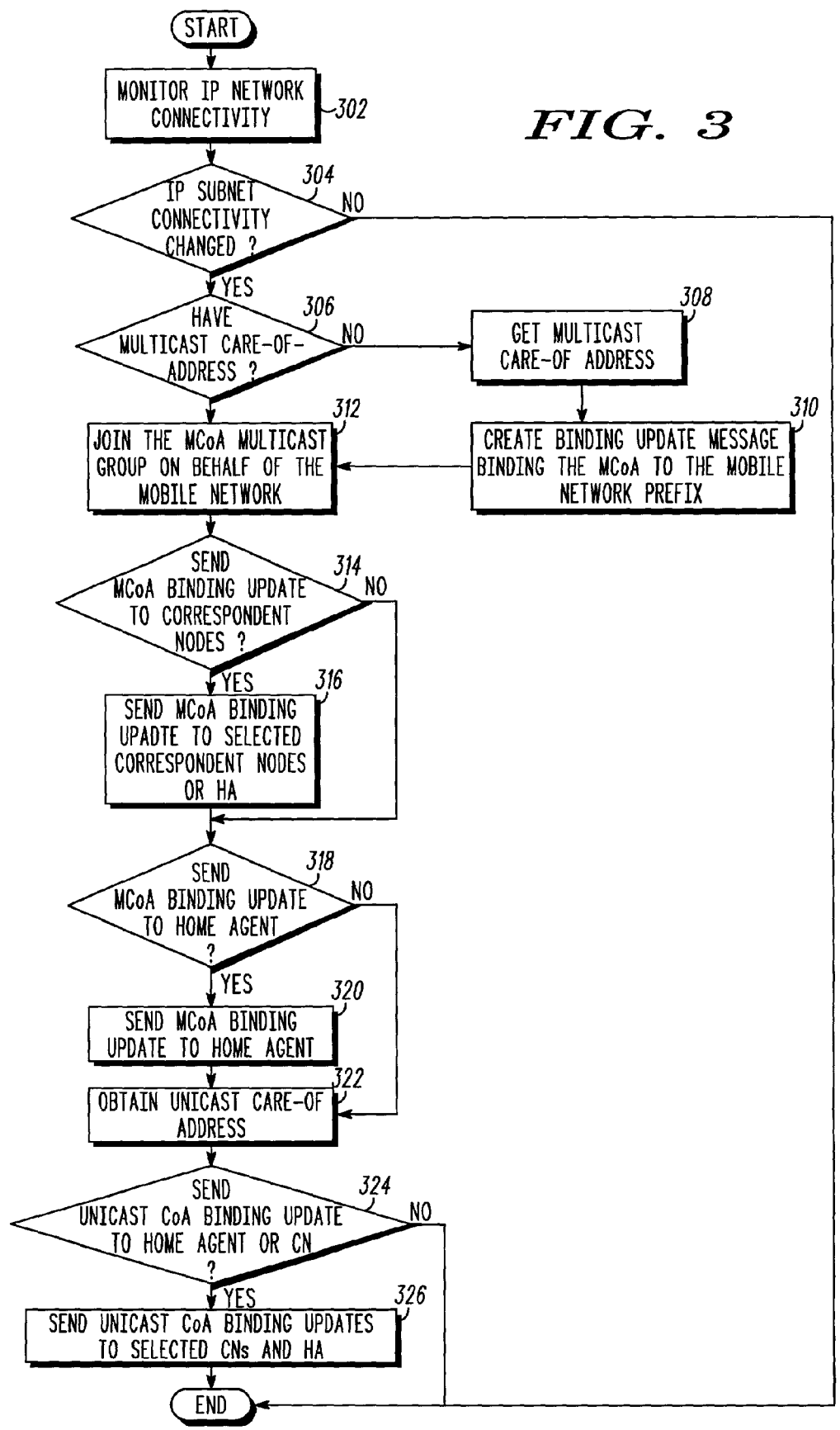
FIG. 3 is a flowchart showing steps performed by mobile routers in obtaining a multicast care of address, binding the multicast care of address to a subnet prefix and communicating the multicast care of address to correspondent nodes according to the invention.

Now turning to FIG. 3, there is shown a flowchart showing various steps performed by a mobile router 106 to obtain a multicast care of address associated with a mobile network and to communicate the multicast care of address to correspondent nodes. The steps of FIG. 3 are implemented, where applicable, using stored software routines within the mobile router 106. At block 302, the mobile router 106 monitors IP network connectivity of its associated mobile network. That is, the mobile router 106 monitors whether the mobile network is linked to the IP network infrastructure via its "home" IPv6 subnet prefix or whether it has moved to a foreign network requiring a care of address. At block 304, the mobile router determines whether its IP subnet connectivity has changed. For example, a change in IP subnet connectivity may result from movement of the mobile network from a home network to a foreign network, from one foreign network to another or from a foreign network back to the home network. If, at step 304, there is no change in IP subnet connectivity, the process ends until such time as there is a change in IP subnet connectivity.

Otherwise, if there is a change in IP subnet connectivity, the process proceeds to step 306 to determine whether the mobile network has a multicast care of address. If not, the mobile router 106 obtains a multicast care of address at step 308 to be used as a proxy address for the mobile network hosts while the mobile network is away from its home network. At step 310, the mobile router creates a binding update message binding (or associating) the IP multicast care of address ("MCoA") to the mobile subnet prefix of the mobile network.

After having obtained a multicast care of address at step 308, or if the mobile network is determined at step 306 to already have a multicast care of address, the mobile router joins the multicast care of address at step 312 on behalf of the mobile network. Having joined the multicast care of address, the mobile router is able to receive messages addressed to the multicast care of address from the home agent or correspondent nodes.

Then, at step 314, the mobile router determines whether it desires to send a MCoA binding update message to correspondent nodes. This decision may be based upon security policies, quality of service policies or privacy attributes relative to the correspondent nodes. If MCoA binding update(s) are desired to be sent to correspondent node(s), the mobile router sends the binding updates to the selected CNs at step 316. The MCoA binding updates may be sent separately or "piggybacked" along with message packets addressed to the CNs. The MCoA binding updates inform the CNs of the multicast care of address so that they may send messages directly to the multicast care of address, rather than the home address, to avoid triangular routing.

Next, at step 318, the mobile router determines whether it needs or desires to send a MCoA binding update to the home agent. If so, the mobile router sends a MCoA binding update message to the HA at step 320. The MCoA binding updates may be sent separately or "piggybacked" along with message packets addressed to the HA.

In one embodiment, the mobile router obtains a unicast care of address as well as a multicast care of address upon changes in IP subnet connectivity of the mobile network. The mobile router obtains the unicast care of address ("CoA") at step 322. At step 324, the mobile router determines whether it desires to send a unicast CoA binding update message to the home agent or correspondent nodes. As with the MCoA binding update, this decision may be based upon security policies, quality of service policies or privacy attributes relative to the correspondent nodes. If CoA binding update(s) are desired to be sent to the HA or CN(s), the mobile router sends the CoA binding updates to the HA and/or selected CNs at step 326. The CoA binding updates inform the CNs of the unicast care of address so that they may send messages directly to the unicast care of address, rather than the home address, to avoid triangular routing. Thus, the CNs, if so informed, may address packets to either the multicast or unicast care of address to avoid triangular routing. Alternatively, it is envisioned that the mobile network could use only a multicast care of address and eliminate the unicast care of address.

Figure 4:
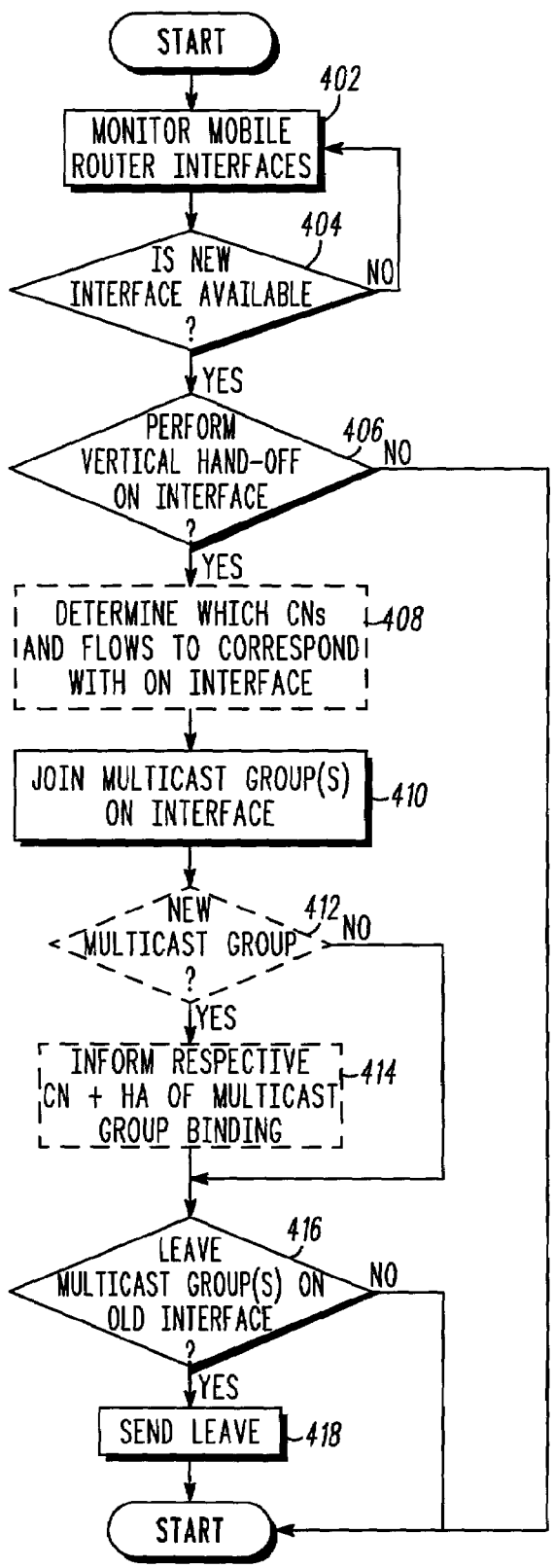
FIG. 4 is a flowchart showing steps performed by mobile routers to accomplish smooth vertical handoffs according to the invention.

FIG. 4 is a flowchart useful for showing how the multicast care of address according to the present invention enables smooth vertical handoffs between external networks. The steps of FIG. 4 are implemented, where applicable, using stored software routines within the mobile router 106. At block 402, the mobile router 106 monitors its router interfaces to determine its accessibility to external networks. For example, with reference to FIG. 1, the mobile router 106 (having SAM and WLAN interfaces) determines whether it is within the coverage area of a SAM site and/or WLAN site. At block 404, the mobile router determines whether a new interface is available. Thus, for example, if the mobile router 106 is presently communicating with a SAM site, it may determine that a WLAN site is also accessible. In such case, the mobile router determines at step 406 whether it desires to perform a vertical handoff on the interface (i.e., to switch to the WLAN site). If a vertical handoff is not desired, the process ends until such time as a new interface becomes available.

As will be appreciated, various possible strategies may be used for the mobile router to determine whether to perform a vertical handoff. Some examples are: the mobile router may choose WLAN or SAM based on the application (e.g., voice, video, web, data, etc.); it may choose vertical mobility on an as needed basis (e.g., move from SAM to WLAN if communication is impaired on SAM link); or it may favor WLAN hotspots (e.g., always use WLAN when available, and switch back to SAM when WLAN is out of reach). Having determined that a vertical handoff is desired, the mobile router optionally determines at step 408 which CNs to correspond with on the new interface. That is, the mobile router may choose to correspond with only a subset of the CNs on the new interface, while continuing to correspond with certain CNs on the previous interface. The vertical handoff might otherwise nominally result in changing all CNs and flows to the new interface. The mobile router joins the multicast care of address at step 410 on the new interface, by issuing (in IPv6 terminology) multicast listener discovery (MLD) "Report" messages to an attached router as is known in the art.

After the mobile router joins the multicast care of address on the new interface, the routers of the network create new branches of a multicast routing tree, as appropriate, to enable the mobile router to receive messages addressed to the multicast care of address from the home agent or correspondent nodes, via the new external interface (e.g., the WLAN site). For example, with reference to FIG. 1, suppose the mobile router is presently communicating, via its SAM interface, with site 130 (i.e., the mixed site). In such case, a multicast routing tree will already have been established that connects site 130 to the HA and CNs but most likely will not include site 140. Upon the mobile router determining that a vertical handoff is desired to the WLAN interface to communicate with site 140 (i.e., the broadband site) and upon the mobile router joining the multicast group on the WLAN interface, the routers of the network will create a new branch of the multicast routing tree that extends to the broadband site 140. Optionally, if the multicast group joined at step 410 is a new multicast group (determined at step 412), the mobile router may send a MCoA binding update message to correspondent nodes or the home agent such as described in relation to FIG. 3.

At step 416, the mobile router determines whether it wishes to leave the multicast group address on the old interface. If so, the mobile router sends leave messages at step 418 to leave the multicast group address on the old interface, causing the routers of the network to remove or "prune" any unnecessary branch(es) of the multicast routing tree. Thus, continuing the previous example, upon the mobile router leaving the multicast group on the SAM interface, the routers of the network may prune the branch of the multicast routing tree that leads to the mixed site 130. If, at step 416, the mobile router determines that it does not wish to leave the multicast group on the old interface, the mobile router remains joined to the multicast group address on the old interface so as to continue to receive packets on the old interface (e.g., from the mixed site 130) as well as the new interface (e.g., from the broadband site 140).

As will be appreciated, the present invention also provides for smooth horizontal handoffs (e.g., between different SAM sites) in similar fashion as vertical handoffs. In the preferred embodiment, the horizontal and/or vertical handoffs are performed by the mobile router independent from the mobile network nodes and correspondent nodes. Thus, for example, where the mobile router has a SAM interface and a WLAN interface, neither the CN or the mobile network nodes will generally care which interface the mobile router receives or sends its packets on. Vertical handoffs and horizontal handoffs are the same from this perspective. Typically, each mobile host has only one active IP address while attached to the mobile router. The hosts will send and receive packets on this interface and will not break a session when the mobile router switches between SAM and WLAN or switches between different SAM sites.

Figure 5:
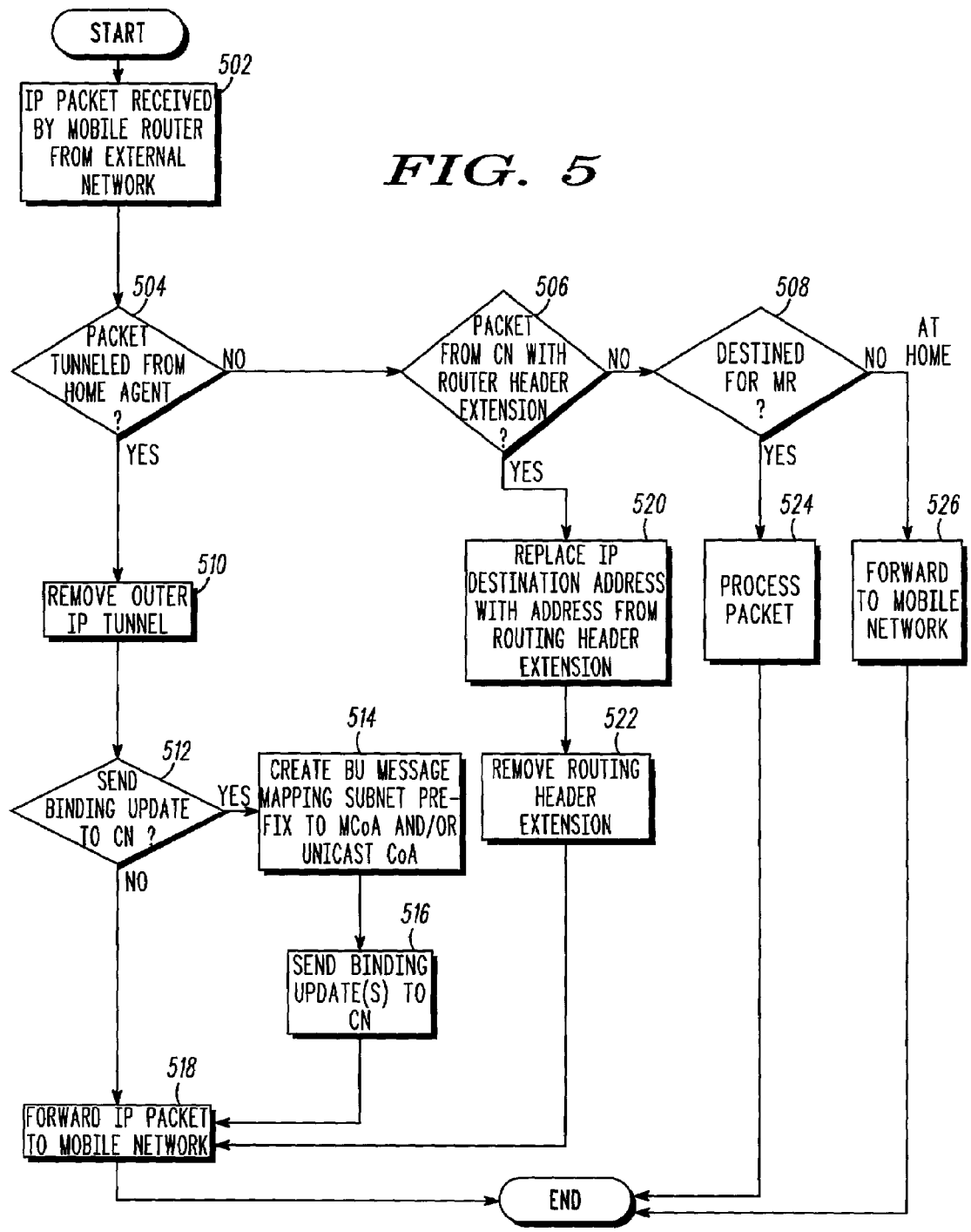
FIG. 5 is a flowchart showing steps performed by mobile routers to process IP packets sent from a correspondent node to a mobile network node according to the invention.

FIG. 5 shows various steps performed by a mobile router to process IP packets received from correspondent nodes. The steps of FIG. 5 are implemented, where applicable, using stored software routines within the mobile router 106. At step 502, the mobile router receives packets from an external network. Thus, for example, the mobile router may receive packets from a SAM site or WLAN site that are targeted to one of the mobile network nodes. At step 504, the mobile router determines whether the packets were tunneled from the home agent and thereby were non-optimally routed (i.e., triangularly routed) to the mobile router.

In the case where a CN communicates for the first time with a mobile network host (or has not communicated recently enough to know the mobile network host should be reached by its care of address), the CN will create standard IP packet(s) and send the packets to the host's home address. The packet(s) will include a source address field including the unicast IP address of the sourcing CN and a destination address field including the unicast IP address of the targeted mobile network node. The packets are routed through the network to the mobile router's home network (i.e., the network to which the mobile network is attached) where they are intercepted by the mobile router's home agent. Here, according to principles of the present invention, the home agent will find the mobile network's subnet bound to a multicast care of address. The home agent will then encapsulate the original IP packet(s) in a new outer IPv6 header, with the outer IP packet indicating the home agent as the source and the multicast CoA of the mobile network as the destination address.

In the case where packets are sent from a CN directly to the multicast care of address of the mobile network, the packet will include an IPv6 routing header (instead of IPv6 encapsulation) with the targeted mobile network node's unicast address. Thus, the mobile router may determine that packets were tunneled by detecting the presence of an outer IP header from the home agent; or the mobile router may determine that packets were not tunneled by detecting an inner routing header including the unicast IP address of the targeted host.

If the packets were determined to be tunneled by the HA (i.e., the packets were non-optimally routed from the CN), the process proceeds to step 510 where the mobile router removes the outer IPv6 header of the tunneled packet, yielding an inner IP header having the IP address of the targeted mobile network host. The mobile router determines at step 512 whether to send a binding update to the CN and thereby optimize routing. If a binding update is desired, a binding update message is created at step 514 mapping the subnet prefix of the mobile network to the MCoA and/or unicast CoA, and the binding update is sent to the CN at step 516 so that future packets may travel the shortest tree and avoid the overhead of tunneling. After having sent the binding update, or if a binding update is not desired, the original IP packet is forwarded to the mobile network host identified in the destination field of the inner IP header, on one of its directly connected subnets at step 518.

If the packets were determined not to be tunneled from the HA (i.e., the packets were sent directly from a CN), the process proceeds to step 506 where it is determined whether the received packets include a router header extension, i.e., defining a unicast address of a target mobile network host. If so, the mobile router at step 520 replaces the IP destination address in the received packet(s) with the unicast address identified in the router header extension (thereby placing the unicast address into a target destination field) and removes the router header extension at step 522 before forwarding the packets to the mobile network host at step 518.

If, at step 506, the packets are determined not to include a router header extension, it is determined at step 508 whether the packets are destined for the mobile router. If they are, the packets are processed by the mobile router at step 524 and the process ends. If not, the mobile network is at home and the packets are forwarded to the mobile network at step 526.

Figure 6:
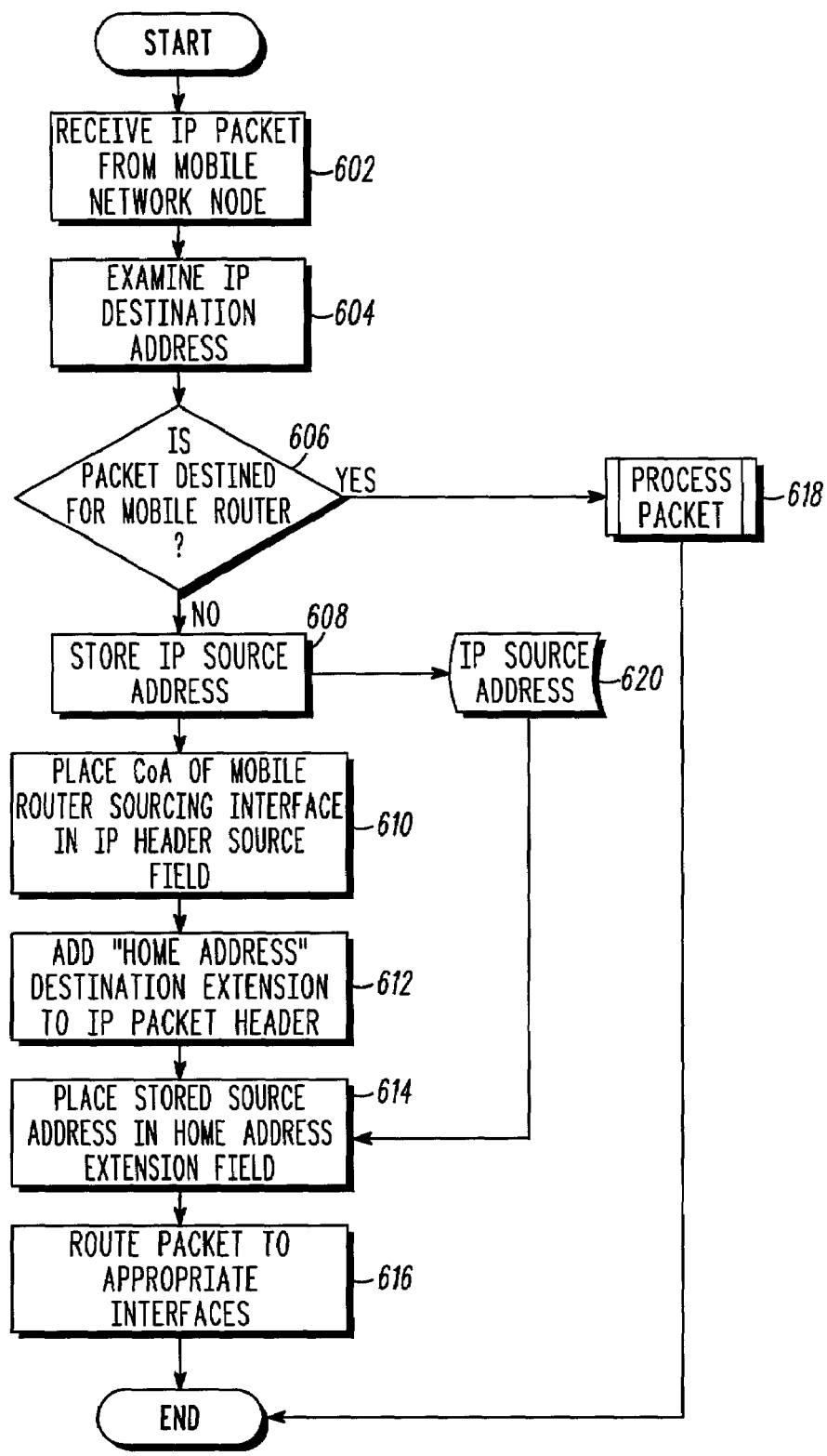
FIG. 6 is a flowchart showing steps performed by mobile routers to process IP packets sent from a mobile network node to a correspondent node according to the invention.

FIG. 6 is a flowchart showing steps performed by mobile routers to process IP packets sent from a mobile network host to a correspondent node. The steps of FIG. 6 are implemented, where applicable, using stored software routines within the mobile router 106. At step 602, the mobile router intercepts IP packet(s) sent from the mobile network host. The packet(s) will include a source address field including the unicast IP address of the sourcing mobile network host and a destination address field including the IP address of the targeted CN. It is noted that the destination IP address may comprise a normal unicast address (i.e., the home address of the CN), a unicast care of address (i.e., in case the CN is itself mobile) or a multicast care of address (i.e., in case the CN is attached to a mobile network of its own). In the case where the destination address is a multicast address (i.e., the MCoA of the CN), the packets formed by the mobile network host will also include a routing header with the CN's unicast address. At step 604, the mobile router examines the IP destination address of the packet(s). If the packets are destined for the mobile router (determined at step 606), the mobile router processes the packet at step 618 and the process ends.

If the packets are not destined for the mobile router (i.e., they are destined for a correspondent node), the process proceeds to steps 608–616. At step 608, the mobile router stores the unicast IP address of the source (obtained from the source address field) of the intercepted packet. At step 610, the mobile router replaces the unicast IP address in the source address field with the CoA associated with the mobile router sourcing interface (i.e., the external interface that is being used by the mobile router to source the packets into the network). At step 612, the mobile router adds a home address extension field to the IP packet header(s) and at step 614, places the unicast IP address of the sourcing mobile network host (retrieved from storage at step 620) in the home address extension field. Thus, the packet(s) modified by the mobile router will have a source address field including the mobile router's CoA; a destination address field including the MCoA, unicast address or unicast CoA of the targeted CN; and a home address field including the IP address of the sourcing mobile network host. In the case where the destination address is the MCoA or CoA of the CN, the packets to be sent by the mobile router will also include a routing header with the CN's unicast address. At step 616, the mobile router sends the packets to the CN via the appropriate external interface. Upon reaching the targeted CN, the CN will swap the IP header's source address and home address field to find the true source address and pass that address to the upper layer protocol (as per standard IPv6 behavior).

One of the advantageous features of using a multicast care of address, rather than unicast care of address is that it significantly minimizes mobile-IP binding updates. Rather than sending binding updates to every CN and HA on every site change (i.e., as for unicast CoA), the MCoA remains the same and typically there are no binding updates (only a single multicast Join) upon mobile network subnet changes. This is best observed in FIGS. 7a–7g.

Figure 7A:
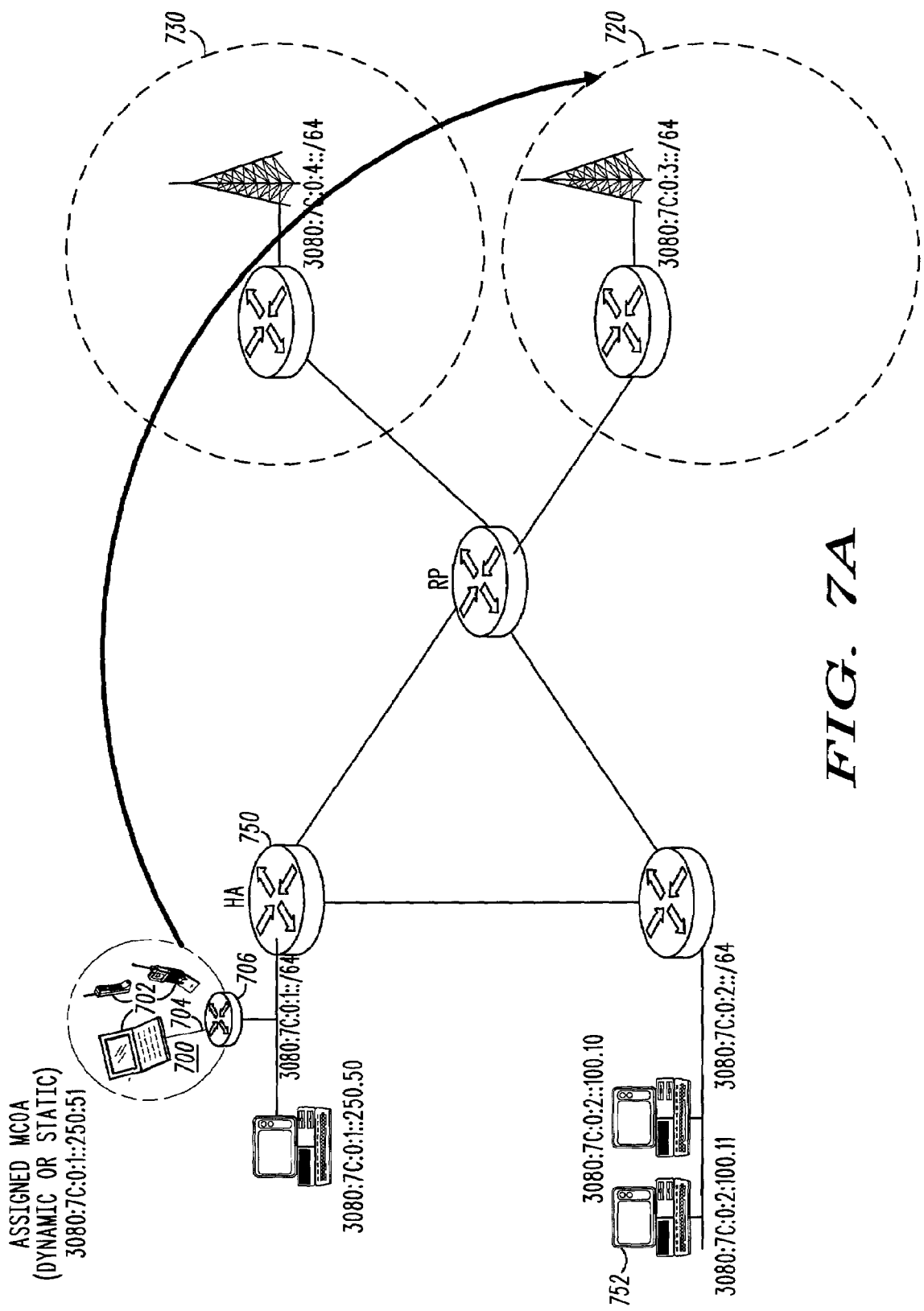
Figure 7B:
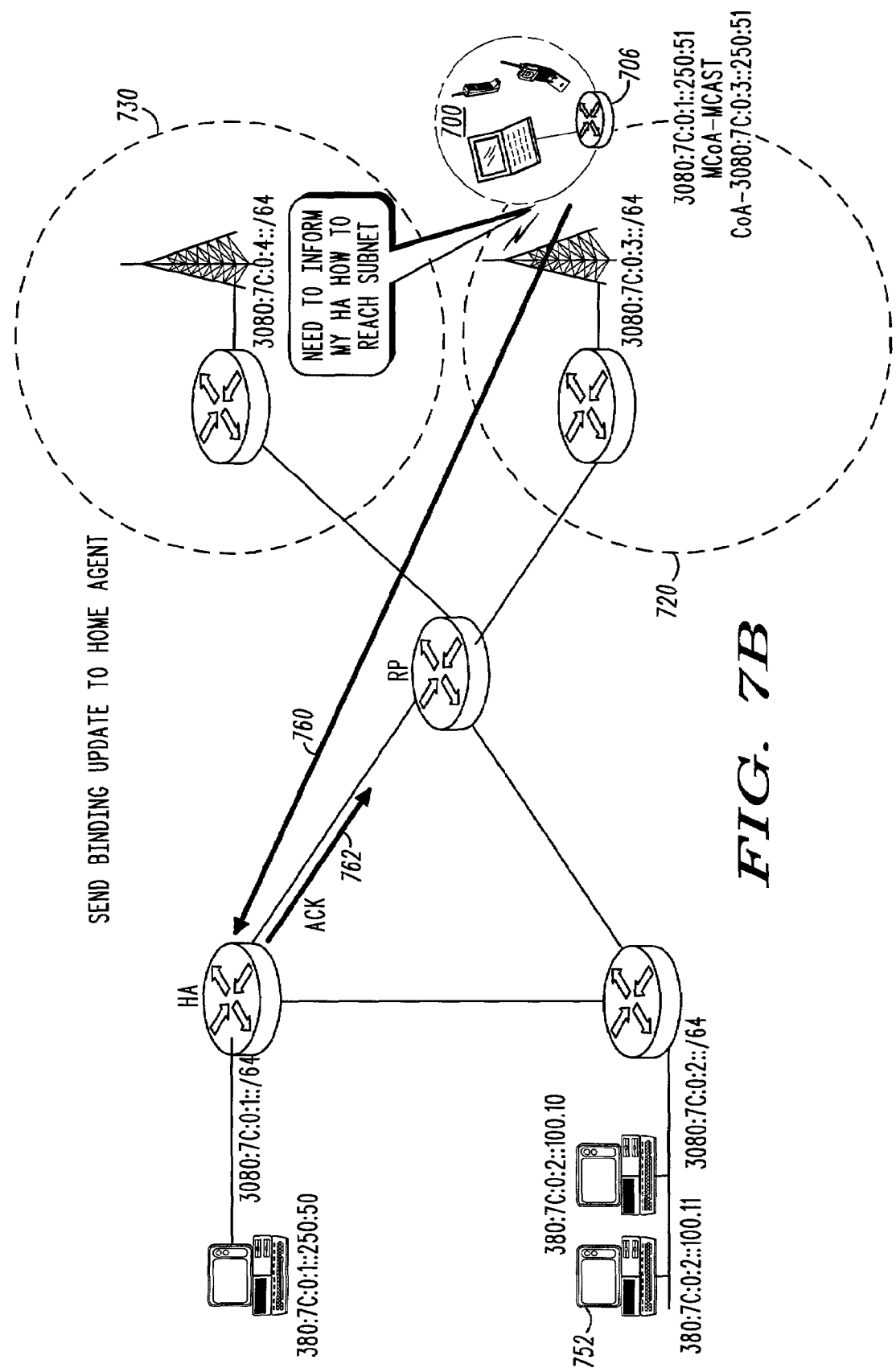

Referring initially to FIG. 7a, there is shown a mobile network 700 comprising a mobile router 706 attached by link 704 to various mobile network nodes 702. The mobile network is initially attached to its "home" IPv6 subnet prefix 145.1 and is linked to its home agent ("HA") 750. The home agent 750 is connected by various routers forming an IP network to wireless sites 720, 730 and fixed correspondent nodes 752. The mobile network then moves to a foreign network, site 720. As shown in FIG. 7b, the mobile router decides that it needs to inform its HA how to reach its new subnet. It does so by sending a binding update message 760 to the HA. The binding update identifies the multicast care of address of the mobile network and binds it to the prefix 3080:7C:0:3::/64 (as shown). The unicast and multicast care of addresses may be identified in the same or different binding update message(s). The HA indicates that it has received the binding update with an acknowledgement message 762.

Figure 7C:
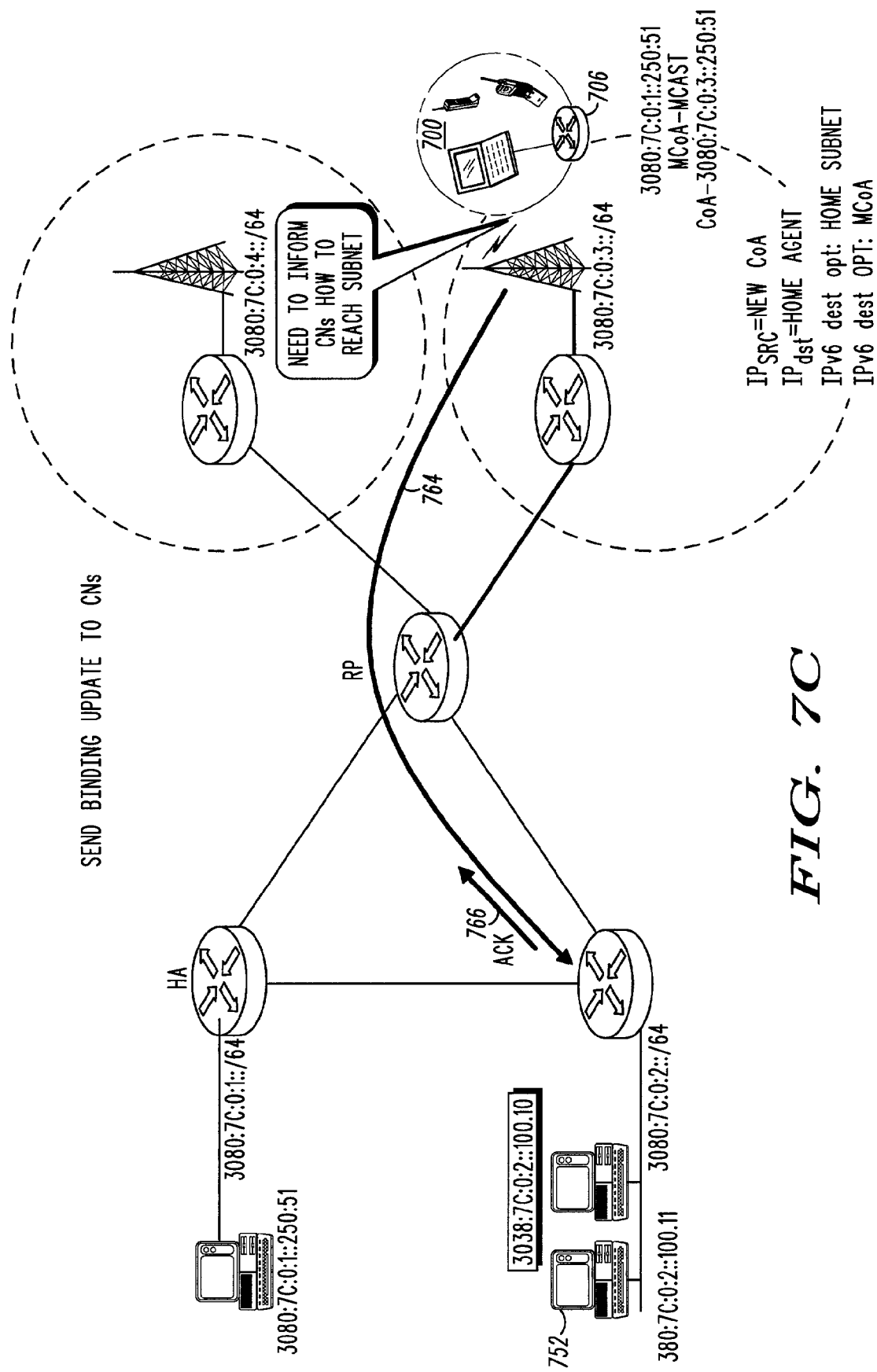

Next, as shown in FIG. 7c, the mobile router decides that it needs to inform its CNs 752 how to reach its new subnet. It does so by sending a binding update message 764 to the CNs 752. As with the binding update sent to the HA, the binding update 764 identifies the multicast care of address of the mobile network and binds it to the prefix 3080:7C:0:3::/64 (as shown). The unicast and multicast care of addresses may be identified in the same or different binding update message(s). The CNs indicate that they have received the binding update with an acknowledgement message 766.

Figure 7D:
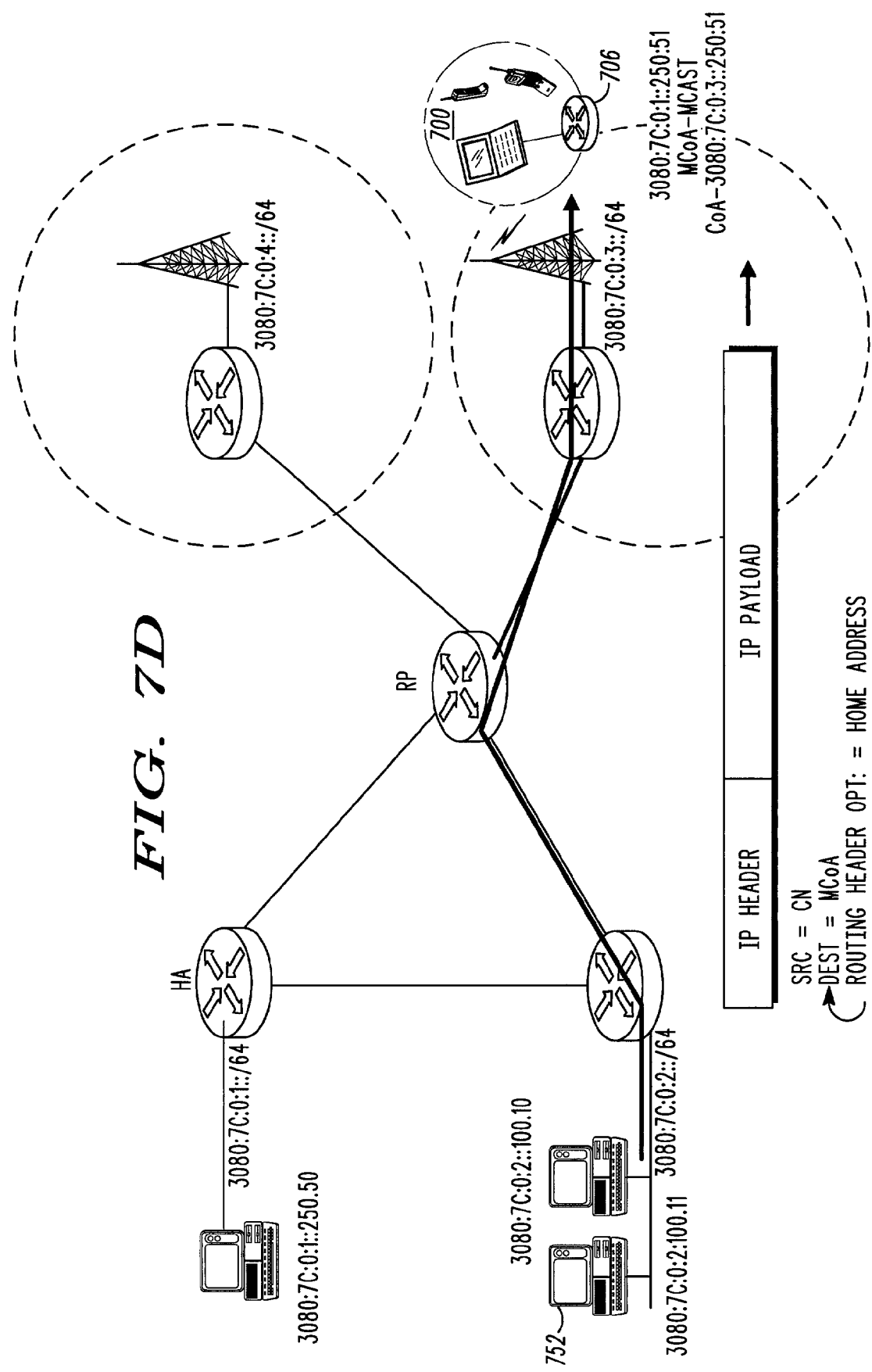

As best observed in FIG. 7d, the mobile router joins the multicast address, causing the routers of the network to form a multicast routing tree extending to the foreign site 720. Upon a CN sending an IP packet to the multicast care of address, the packet is routed to the mobile network 700.

Figure 7E:
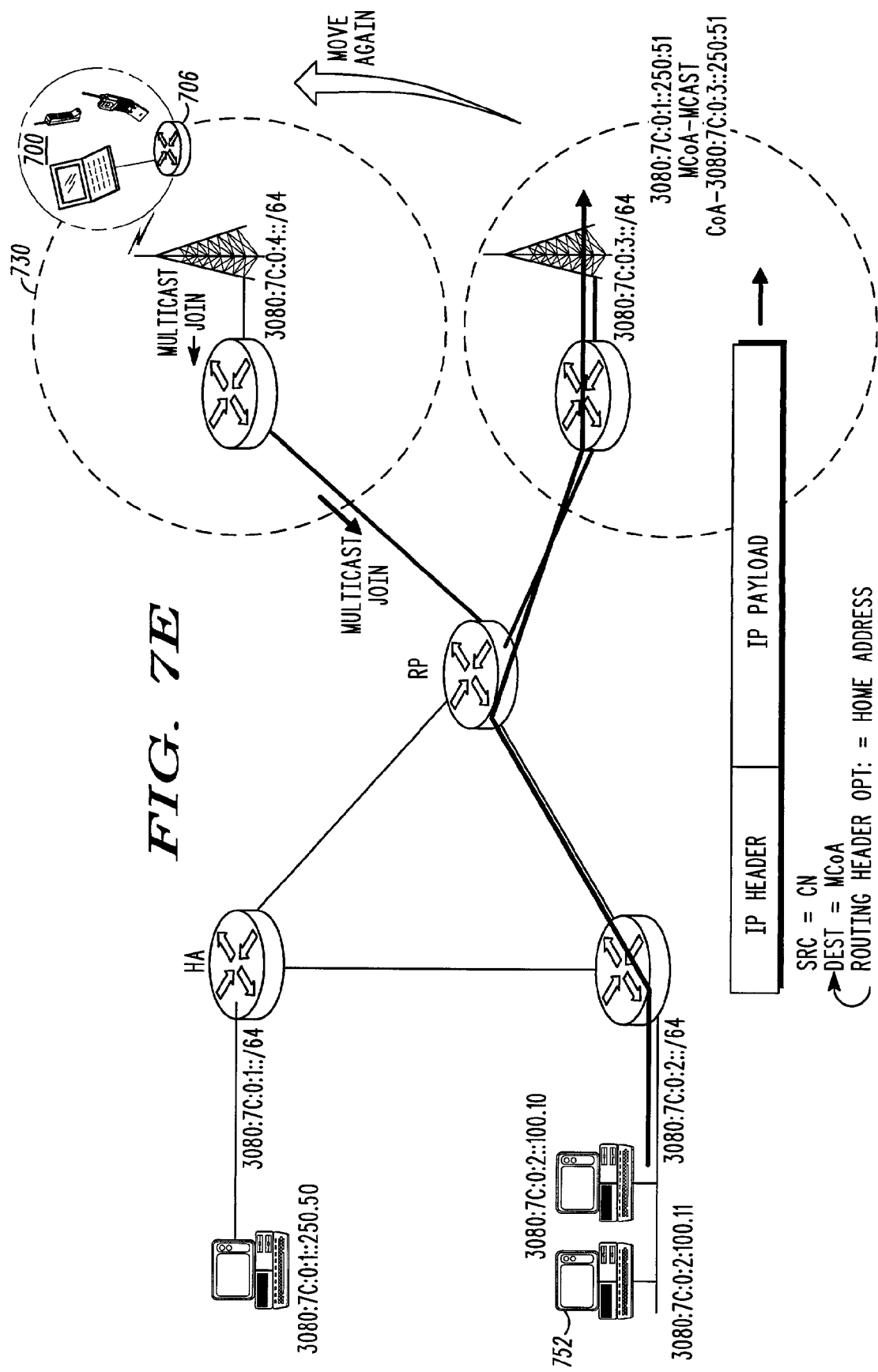
Figure 7F:
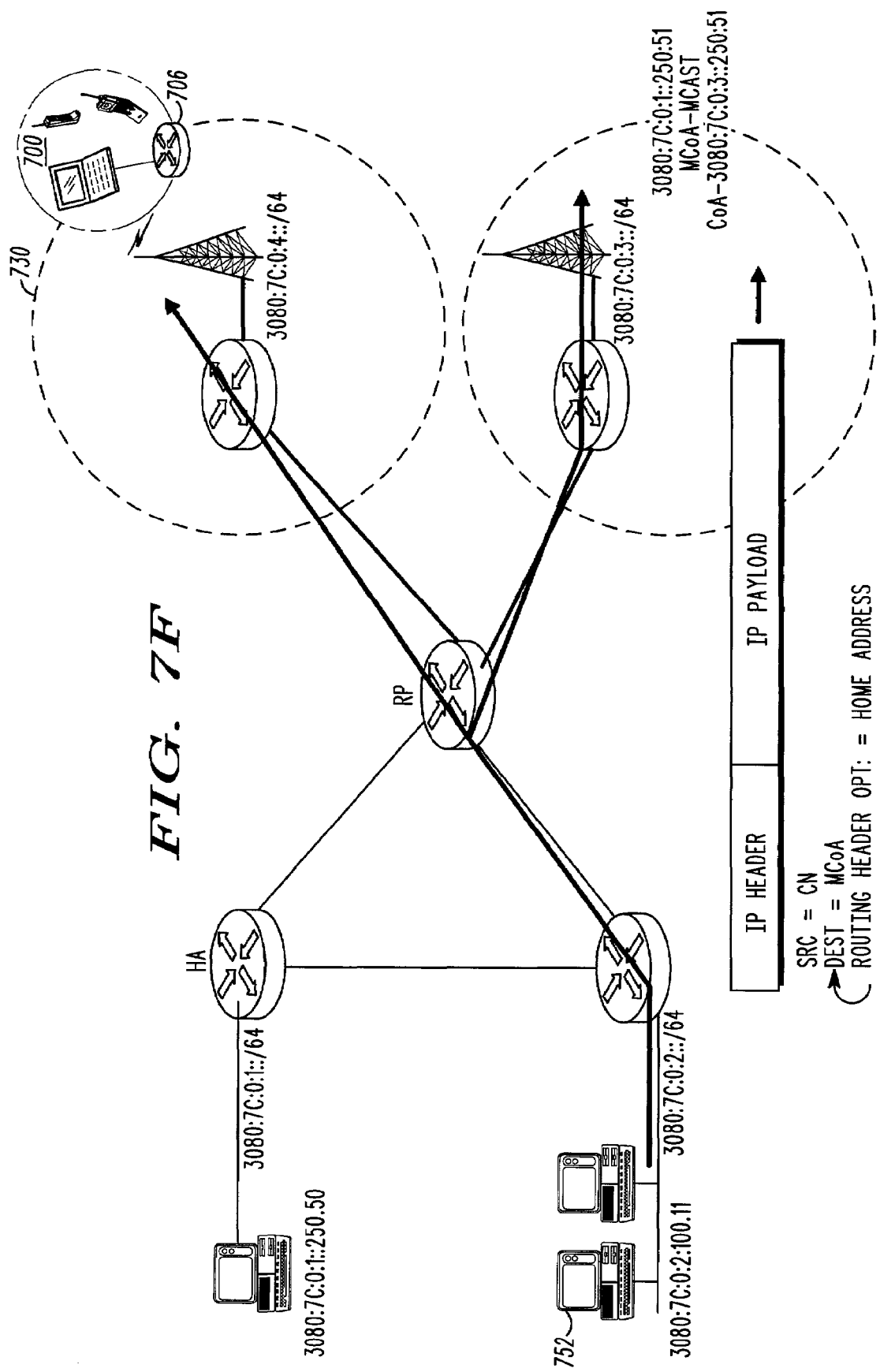

Then, as shown in FIG. 7e, the mobile network moves again, to site 730. The mobile router joins the multicast address on the new network causing the routers of the network to form a new branch of the multicast routing tree extending to site 730. As shown in FIG. 7f, the packets from the CN are routed to the mobile network 700 at its new location with little or no interruption in service flow, without the mobile router having sent any more binding updates. Only a single multicast join was required. The packets also continue to be routed to the former site 720, until such time as the former site leaves the multicast address. Then, as shown in FIG. 7g, site 720 leaves the multicast address, causing the routers of the network to prune the branch of the multicast routing tree leading to site 720.

Figure 9:
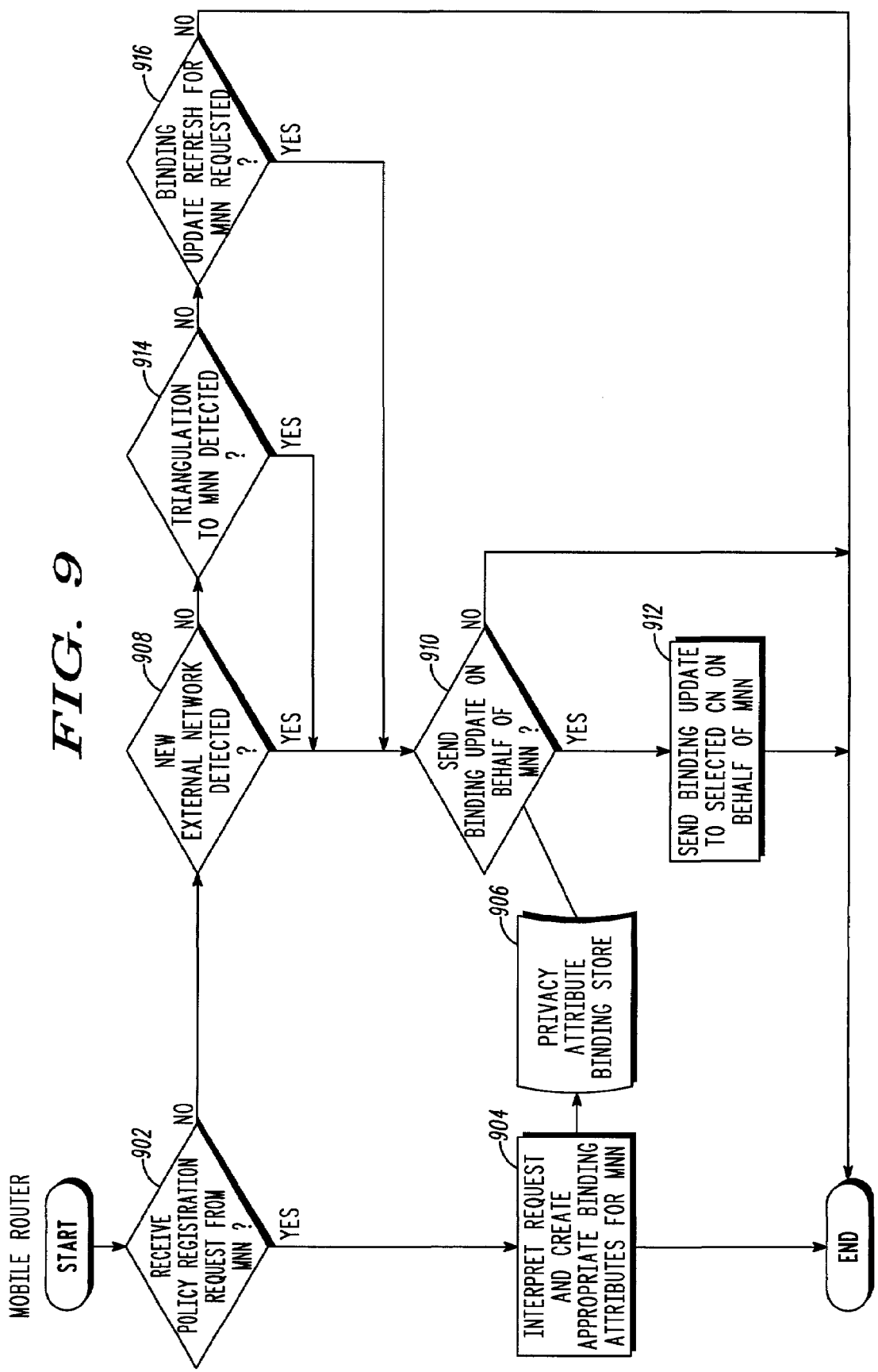
FIG. 9 shows steps performed by a mobile router in determining when and to which CNs to send binding updates.

Another advantageous feature of the present invention is that a mobile network host may choose to keep its location private from certain correspondent nodes. This is accomplished by specifying privacy attributes that indicate how the mobile router should discriminate in sending binding updates to the CNs. FIG. 8 shows steps performed by a mobile node to establish (or not establish) privacy policies with the mobile router; and FIG. 9 shows steps performed by a mobile router responsive to receiving the privacy policies. The steps of FIGS. 8 and 9 are implemented, where applicable, using stored software routines within the mobile router and/or mobile network nodes.

Turning first to FIG. 8, the process starts at step 802 with a mobile network node establishing a connection with the mobile router. At step 804, the mobile network node determines whether it wishes to establish any privacy policies. If not, the process ends. Otherwise, at step 806, the mobile network node determines whether it desires to send binding updates to all active CNs communicating with the mobile network node. In such case, the mobile network node registers privacy attributes with the mobile router at step 808 that allow the mobile router to send such binding updates to the active CNs.

If the mobile network node doesn't wish to send binding updates to all CNs, the process proceeds to step 810 where it is determined whether the mobile network node desires to refrain from sending binding updates to any CNs (i.e., to send binding updates to no CNs). In such case, the mobile network node registers privacy attributes with the mobile router at step 808 that disallow the mobile router from sending binding updates to any CNs.

If the mobile network node neither wishes to send binding updates to all CNs or no CNs, the process proceeds to step 812 where it is determined whether the mobile network node desires the mobile router to send binding updates to an inclusive list of CNs (i.e., all CNs that satisfy a certain selection criteria). The selection criteria may be based on a variety of factors. Some examples include selecting all CNs that are within a certain range of IP addresses, or selecting all CNs that are members of an autonomous system (e.g., a company-wide system of Motorola, Inc.). If the mobile network node determines that it wishes the mobile router to send binding updates according to such an inclusive list, it registers privacy attributes with the mobile router at step 808 that specify the inclusive list.

If the mobile network node does not choose any of the previous options for sending binding updates, the process proceeds to step 814 where it is determined whether the mobile network node desires the mobile router to send binding updates to an exclusive list of CNs (i.e., all CNs except those that satisfy a certain selection criteria). For example, the exclusive list may cause the mobile router to send binding updates to all CNs except those that are within a certain range of IP addresses, or to all CNs except those that are members of a certain autonomous system. If the mobile network node determines that it wishes the mobile router to send binding updates according to such an exclusive list, it registers privacy attributes with the mobile router at step 808 that specify the exclusive list.

Now turning to FIG. 9, there is shown various steps performed by a mobile router relative to processing privacy policy requests from a mobile network node. At step 902, the mobile router determines whether it has received a policy registration request from a mobile network node. If so, it interprets the request at step 904 to define one or more privacy attributes associated with the mobile network node. As has been described in relation to FIG. 8, the privacy policy attributes may instruct the mobile router to send binding updates to all active CNs, or no CNs, or to send binding updates according to an inclusive or exclusive list of CNs. The mobile router stores the privacy attributes at step 906.

If the mobile router has not received a privacy policy request from a mobile network node, the process proceeds to step 908 where it is determined whether the mobile router detects a new external network (i.e., resulting from horizontal or vertical mobility of the mobile network). If so, the mobile router determines at step 910 whether to send a binding update on behalf of the mobile network node. The process similarly proceeds to step 910 if triangulation is detected by the mobile router (determined at step 914) or upon a binding update refresh being requested for the mobile network node (determined at step 916). If the mobile router determines at step 910 that it should send binding update(s) on behalf of the mobile network node, it does so at step 912, as appropriate according to any established privacy attributes. That is, if the mobile network node had previously registered privacy attributes with the mobile router, the mobile router will send the binding updates to a number of CNs based on the privacy attributes. In one embodiment, if the mobile network node had not previously registered any privacy attributes with the mobile router, the mobile router will send binding updates according to a predetermined default privacy attribute policy (e.g., perhaps all CNs). The process ends after the mobile router has completed sending binding update(s) at step 912, or if the mobile router determines that it does not need to send any binding updates at step 910.

The present disclosure has identified a mobility solution for mobile networks that provides smooth handoffs by combining features of IP multicast and mobile-IPv6. The solution builds on top of and is interoperable with mobile-IPv6. The present invention nearly eliminates binding update storms and minimizes handover times, is independent of the layer 1/layer 2 access technology (e.g., SAM and WLAN) and thereby supports vertical handoffs. As the mobile network roams, it only needs to join a single multicast group to maintain connectivity to the home agent and correspondent nodes. The invention allows a mobile network host to keep its location private from certain correspondent nodes by specifying how the mobile router should discriminate in sending binding updates to the CNs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   receiving a privacy policy request from a mobile network node;
   interpreting the request to define one or more privacy attributes associated with the mobile network node; and
   in an instance that a binding update is to be sent on behalf of the mobile network node, determining, based on the one or more privacy attributes, a selected number of correspondent nodes to receive the binding update; and sending the binding update to the selected number of correspondent nodes.

2. The method of claim 1, performed by a mobile router operably attached to the mobile network node.

3. The method of claim 1, wherein the privacy attributes allow sending the binding update to all active correspondent nodes communicating with the mobile network node.

4. The method of claim 1, wherein the privacy attributes disallow sending the binding update to any correspondent nodes.

5. The method of claim 1, wherein the privacy attributes allow sending the binding update only to correspondent nodes satisfying a selection criteria, thereby defining an inclusive list.

6. The method of claim 5, wherein the selection criteria is based on one of: a range of IP addresses and autonomous system membership.

7. The method of claim 1, wherein the privacy attributes allow sending the binding update only to correspondent nodes exclusive of those satisfying a selection criteria, thereby defining an exclusive list.

8. The method of claim 7, wherein the selection criteria is based on one of: a range of IP addresses and autonomous system membership.

9. The method of claim 1, wherein the step of sending the binding update comprises sending one of a multicast and unicast binding update message to the number of correspondent nodes.

10. In a communication system comprising a mobile network including one or more mobile network hosts attached to a mobile router, a method comprising the mobile router:
    obtaining a multicast care of address associated with the mobile network, the multicast care of address being used as a proxy address for the mobile network hosts responsive to mobility of the mobile network from a home network to a foreign network;
    determining privacy attributes associated with the mobile network hosts; and
    communicating a binding update message including the multicast care of address to selected correspondent nodes consistent with the privacy attributes of the mobile network hosts.

11. The method of claim 10, further comprising the mobile router:
    receiving, via IP tunneling from a home agent, one or more IP packets to a targeted mobile network node from a correspondent node not having received the binding update message;
    sending the packets to the targeted mobile network node; and
    sending a binding update identifying the multicast care of address to the correspondent node, only if the binding update is permitted according to the privacy attributes of the targeted network node.

12. A mobile router comprising:
    a mobile network interface operably connecting the mobile router to one or more mobile network hosts defining a mobile network;
    a multicast care of address binding management element for obtaining, responsive to movement of the mobile network from a home network to a foreign network, a multicast care of address adapted for use as a proxy address of the mobile network hosts;
    a privacy attribute database identifying requested privacy attributes of the mobile network hosts relative to maintaining privacy of the multicast care of address; and
    a routing element operable to send binding update messages including the multicast care of address to a selected number of correspondent nodes consistent with the requested privacy attributes of the mobile network hosts.

* * * * *